(12) United States Patent
Rein et al.

(10) Patent No.: US 8,108,779 B1
(45) Date of Patent: Jan. 31, 2012

(54) COLLABORATIVE EDITING OPERATIONS

(75) Inventors: Todd Rein, San Francisco, CA (US); Marissa Dulaney, Morgan Hill, CA (US); Robert Shaver, Watertown, MA (US); Eylon Stroh, San Carlos, CA (US); Roman Dolgov, San Carlos, CA (US); Marco Qualizza, Ontario (CA)

(73) Assignee: Adobe Systems Incorporated, San Jose, CA (US)

( * ) Notice: Subject to any disclaimer, the term of this patent is extended or adjusted under 35 U.S.C. 154(b) by 565 days.

(21) Appl. No.: 12/336,385

(22) Filed: Dec. 16, 2008

(51) Int. Cl.
*G06F 15/00* (2006.01)
*G06F 13/00* (2006.01)

(52) U.S. Cl. ........................ 715/743; 715/733

(58) Field of Classification Search .................. 715/774, 715/743, 733, 851, 853–854, 761–763
See application file for complete search history.

(56) References Cited

U.S. PATENT DOCUMENTS

| | | | |
|---|---|---|---|
| 6,342,906 B1 | 1/2002 | Kumar et al. | |
| 6,636,242 B2 * | 10/2003 | Bowman-Amuah | 715/764 |
| 6,721,921 B1 | 4/2004 | Altman | |
| 2011/0231777 A1 * | 9/2011 | Koren | 715/743 |

* cited by examiner

*Primary Examiner* — Cao "Kevin" Nguyen
(74) *Attorney, Agent, or Firm* — Schwegman, Lundberg & Woessner, P.A.

(57) ABSTRACT

Apparatus, systems, and methods may operate to detect modifications made to information, the modifications received from a modifying user included in a group of users sharing the information by separately viewing presentations of the information. The presentations may have any number of views, such as a first view and at least a second view. Further actions may include transmitting first view data to enable altering the first view for the modifying user based on the modification made, whether the modification comprises a propagating change or a non-propagating change, and if the modification comprises a propagating change, transmitting second view data to enable altering at least the second view for at least some of the group of users, not including the modifying user, based on the modification. If the change is a non-propagating one, then the activity may include refraining from transmitting the second view data. Additional apparatus, systems, and methods are disclosed.

25 Claims, 6 Drawing Sheets

COLLABORATIVE EDITING OPERATIONS

BACKGROUND

In many fields of endeavour, electronic content is regularly reviewed and revised by more than one person. Thus, over the lifetime of the content, many revisions can occur, sometimes as part of collaborative activity involving several editors acting at nearly the same time. As the number of involved editors increases, the quantity of revisions associated with the content also tends to increase. Therefore, managing collaborative editing operations often becomes more complex as the number of participating editors grows.

BRIEF DESCRIPTION OF DRAWINGS

Some embodiments are illustrated by way of example, and not limitation, in the figures of the accompanying drawings, in which.

DETAILED DESCRIPTION

Figure 1:
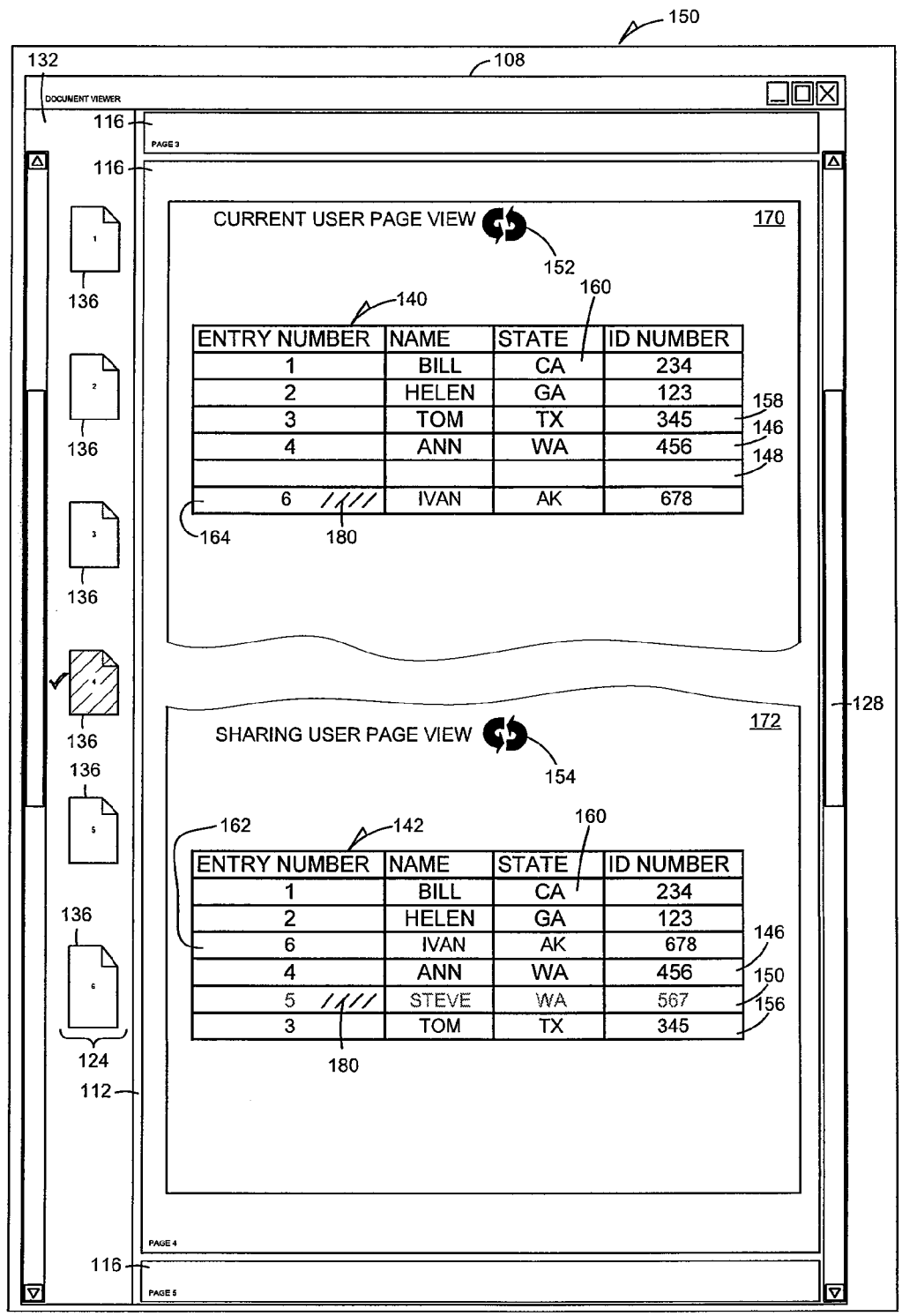
FIG. 1 illustrates views of propagating and non-propagating changes with respect to electronic content as part of a graphical user interface (GUI), according to various embodiments.

Changes made to electronic content in a collaborative environment can be more easily managed when the changes are divided into two types: propagating changes and non-propagating changes. Examples of propagating changes include adding content, deleting content, changing the value of content, or adding/deleting fields (i.e., changes to field existence). Examples of non-propagating changes include changing a view specification for content sorting, content filtering, hiding content, un-hiding content, or the style of display used for content (e.g., the chosen font). In many embodiments, propagating changes made by a modifying user within a group of users are transmitted, in one form or another, to others in the group. Non-propagating changes are only selectively transmitted.

This makes for a dramatic departure from what has been done previously, where either no changes were transmitted, or all changes were transmitted, greatly enhancing the chances of disrupting group editing operations. However, when changes are divided into propagating and non-propagating types, the results of change can be selectively communicated to others in the group in a less disruptive fashion. The resulting group editing experience can be a more smoothly implemented, and is usually less prone to error.

For the purposes of this document, "electronic content" includes any digital data that may be presented to a user (e.g., visually or audibly presented), such as an electronic document, page-descriptive electronic content such as a page-descriptive electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI.

A "content element" includes any part of electronic content that is defined or discernable as a part. For example, a content element may be automatically discerned from a characteristic of the content element itself (e.g., a paragraph of an electronic document, a cell of a spreadsheet, or a database record or field) or may be manually defined by a user (e.g., a user-selected collection of words in an electronic document, a user-selected portion of a digital image). Examples of content elements include portions of a page-descriptive document or other electronic document, such as pieces of electronic text or other material within an electronic document, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by users within electronic content, including instances of scripted and non-scripted dynamic content and the like.

"Documents" may be organized according to a page descriptive format, which includes a portable document format, where "portable document format" means a device-independent and display resolution-independent fixed-layout document format, including the text and fonts, images, and graphic paths associated with the document. The format may comprise a representation of a two-dimensional document, or a three-dimensional document. An example of a commercially available portable document format (PDF) is the format described in "PDF Reference", sixth edition, ADOBE® Portable Document Format, Version 1.7, November 2006.

A "non-propagating change" means a change that does not modify the substance of electronic content, such as a change to the specification for sorting document content, filtering document content, hiding document content, un-hiding document content, or changing the style of the document presentation.

A "propagating change" means a change that operates to modify the substance of electronic content, such as adding content, deleting content, changing the value of content, or changing the existence of a field occupied by some portion of the content.

The term "rendering" used as a verb includes presenting or making accessible electronic content or content elements to be perceived, viewed, or otherwise experienced by a user, or made available for further processing, such as, for example, searching, digesting, printing, analyzing, distilling, or transforming by computational processes that may not include processing the intrinsic data structure describing the electronic content or content element.

The term "rendering" used as a noun includes human-perceivable representations of data that is within a machine and perception-specialized organizations of data defining such representations. For example, a rendering may include a pattern of human-perceivable matter or energy presented on an output device (e.g., a display) by a machine, as well as the organization of data within a machine that defines such patterns. For example, such organizations of data may include the electronic configuration of a memory used by a graphics display processor, or a file containing an audio segment suitable for playing via an audio system of a computer.

The term "rendering module" may be taken to include systems, applications, and mechanisms for rendering or presenting electronic content to a user, including the presentation of content elements such as text, graphics, form element renderings, and other electronic content elements. An example of a rendering module includes a web browser component (e.g., Microsoft® Internet Explorer) or other component to render electronic content such as HyperText Markup Language (HTML) pages. Another example of a rendering module includes the ADOBE® ACROBAT® electronic publishing program.

The term "rendering program" includes applications for rendering or presenting dynamic content to a user. An example of a rendering program is the ADOBE® FLASH® Player 9 runtime software application. In many embodiments, a rendering module interacts with a rendering program to render dynamic content.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information, such as a database). Modules may include hardware circuitry, optical components, single or multi-processor circuits, memory circuits, software program modules and objects, firmware, and combinations thereof, as appropriate for particular implementations of various embodiments. The term "module" can include an identifiable portion of code, data, or a computational object to achieve a particular function, operation, processing, or procedure.

When viewing, reviewing, or editing, a user may begin executing an application (e.g., a rendering module) to render or otherwise present electronic content. This electronic content may take a variety of forms, such as an electronic document, an audio file, video file, sequence of images, dynamic content, combinations thereof, and other forms of electronic content, which may be stored in a database or otherwise.

During the course of this activity, the user may be presented with a rendering of various content elements (e.g., using an output device, such as a display) included or otherwise associated with the electronic content. In some embodiments, these content elements may be presented in a sequential order so as to indicate their positions or interrelationships within the electronic content, or for ease of user perception. For example, database content may be displayed in the form of a spreadsheet.

Content elements contained within electronic content may be presented to a user on an output device in various ways according to the nature of the elements and/or the preferences of users. For example, electronic content representing an electronic document may be presented on a display screen in the form of renderings of pages as they might appear if the electronic document were to be printed out in hardcopy form. Content may also be displayed as a single or multiple-page spreadsheet, and in other ways. In some such embodiments, the user can operate a mouse, keyboard, trackball, touch pad, voice recognizer, or other input devices to explore the electronic content.

Applications may provide affordances, such as scroll bars, fast forward/reverse scan buttons, and other GUI elements to be manipulated by the user to carry out exploration of the electronic content. This exploration may be used when the entirety of the electronic content is too large to conveniently display on a computer screen at one time.

While reviewing or revising electronic content that includes content elements, individual users may wish to record or otherwise keep track of the specifications for a particular view. One way of doing so is by saving the view for future use, and perhaps making the view available to others in a collaborative environment. Managing these views, and the communication of revisions to shared content during collaborative editing activity are addressed by the various mechanisms described herein.

Table I illustrates some of the change types that can occur with respect to electronic content as part of shared editing activity. Here the resulting influence on the view of one person in a group of editors (i.e., the current user) due to actions by all members of the group is shown.

Thus, it can be seen that a variety of change types can be implemented by members of an editorial group with respect to shared content. The change types include appending, inserting, moving, deleting, and updating. The effect on the current user view can be categorized according to which member makes the change—the current user, or some other (sharing) member of the group. Any of the views (e.g., the current user view, or the views of other users) may be filtered and/or sorted, or not.

For example, when information is appended to the content, the information can be added to the end of the content, regardless of which user makes the change. When no filtering/sorting are employed, the current user may see the appended information if they are viewing the end of the content—otherwise their view will not change. When a filter or sorting mechanism is used however, the current user may receive an indication that a change has occurred via the display of a "refresh indicator". This indicator can be activated (e.g., perhaps by clicking on the indicator using a mouse button) so that their current user view will display the appended information according to the filter/sort operations specified.

These same results may occur when the content is updated. That is, the updated content can be displayed to the current user when no filtering or sorting are employed, regardless of the user making the change. If the current user makes use of filters or sorting, then the content can be updated, but the display revisions that might otherwise occur may not be implemented until the refresh indicator is activated by the current user.

TABLE I

| | Current User Makes Change, no filter or sort | Current User Makes Change, filtered or sorted | Sharing User Makes Change, no filter or sort | Sharing User Makes Change, filtered or sorted |
| --- | --- | --- | --- | --- |
| Append Change Type | Record added at the end. | Record added at the end; refresh indicator turned on. | Record added at the end. | Record added at the end, refresh indicator turned on. |
| Insert Change Type | Record added where inserted. | Allowed; record temporarily appears where inserted, but reordered as needed. | Record added at the end; refresh indicator turned on. | Record added at the end; refresh indicator turned on. |
| Move Change Type | Record moved to a desired location. | Allowed; record temporarily appears were moved, and reordered as needed. | Record not moved. Record indicator turned on if the other user also had no sort. | Record not moved. No refresh indicator. |
| Delete Change Type | Record moved. | Record moved. | Record dimmed and refresh indicator turned on. Record removed upon activation. | Record dimmed and refresh indicator turned on. Record removed upon activation. |

TABLE I-continued

| | Current User Makes Change, no filter or sort | Current User Makes Change, filtered or sorted | Sharing User Makes Change, no filter or sort | Sharing User Makes Change, filtered or sorted |
| --- | --- | --- | --- | --- |
| Update Change Type | Record updated. | Record updated. Refresh indicator turned on. | Record updated. | Record updated. Refresh indicator turned on. |

When information is inserted into the content by the current user, and no filtering or sorting are used, the information can simply be added where it was inserted. When filtering or sorting are used by the current user, the information temporarily appears where inserted, and is then moved to its proper location within the content (according to the filter and/or sort specification).

When information is inserted by other users, it is added at the end of the content, and the refresh indicator is then displayed to the current user so that the inserted information can be displayed to the current user.

When a portion of the content is moved by the current user, and no filtering or sorting are used, the information is moved to the location desired by the current user. When filtering or sorting are in use, the information temporarily appears where it was moved, and is then moved to its proper location (according to the filter and/or sort) as needed, for display to the current user.

When a portion of the content is moved by other users in the group, and the current user has no filtering or sorting activated, the information is not moved in the current user view. However, the information may be highlighted to indicate that a change has occurred in another view, and a refresh indicator may be displayed. When other users move information, and the current user has filtering or sorting active, the information is not moved in the current user view, and no refresh indicator is displayed.

When a portion of the content is deleted by the current user, the deleted content is removed from the view displayed to the current user, regardless of whether the current user makes use of sorting or filtering. When content is deleted by other members of the group, the deleted information is dimmed, and the refresh indicator is displayed. The dimmed information continues to be displayed until the refresh indicator is activated, after which it is removed from the current user's view.

Some examples of these change types can be seen in FIG. 1, which illustrates views 170, 172 of propagating and non-propagating changes with respect to electronic content 140, 142 as part of a graphical user interface (GUI) 108, according to various embodiments.

The manner of explanation used herein has been undertaken for convenience and clarity, so as not to obscure the operation of various embodiments with myriad details, and is therefore not to be taken by way of limitation. That is, while the examples given herein are generally directed to the visual display of electronic content in the form of views 170, 172 that show the content as a spreadsheet or matrix, the various embodiments are not to be so limited.

In FIG. 1, the GUI 108 shows an example of a GUI viewport 112 window that may be displayed by a rendering application to present renderings of electronic content in the form of an electronic document 124 that includes several pages 116 of information. For example, the views 170, 172 of electronic content may be displayed as several pages 116 of a document 124, perhaps as an integrated spreadsheet contained on a single page 116 (shown), or as a number of spreadsheet representations broken up into individual panes and/or pages 116 (not shown).

The viewport 112 permits an editor (e.g., current user or other member of an editing group) to see some or all of the document 124; typically, only a portion is shown. In FIG. 1, all of one page 116 (page 4) and parts of other pages 116 (page 3 and page 5) are visible. On the right hand side of the GUI 108, a scroll bar 128 may be provided for a user/editor to scroll through renderings of the various pages 116 of the electronic document 124. The left hand side of the GUI 108 may include a reviewing pane 132 populated by thumbnail or iconic images 136 representing various pages in the electronic document 124.

For convenient reference by the reader, two views 170, 172 are shown on the same page 116. That is, the view 170 of electronic content rendered to a current user (as part of a group of collaborative editors) is shown on the same page 116 as the view 172 of the electronic content that is rendered to a sharing user (e.g. another editor in the same group). In an actual implementation, only one view or the other (i.e., only a rendering of the content as view 170 or view 172, but not both) would likely be presented to an individual member of the group on the display 150. Cursors that identify the location of each editor as they work within the content may be identified via highlighting 180 within the views 170, 172, such as by using shading, colors, icons, text information, and/or images.

When changes to the content are made, a refresh change indicator 152, 154 may form a part of the GUI 108 display associated with an electronic content processing program. The indicators 152, 154 can be located anywhere in the GUI 108, as desired.

Depending on the type of electronic content to be edited, some forms of communication change information may be more useful than others. For example, electronic content in the form of a document comprises collaboration elements at paragraph and/or sentence level. Each user may be notified that another user is working on a particular element through highlighting. If an element is being changed in such a way that it effects the view of the document (e.g., the document is shortened, lengthened, deleted, or reformatted), then the changed element may be displayed in a visually distinctive manner (e.g., "dimmed" using reduced opacity, or "grayed out"), indicating that it has changed in a way that would affect the display. However, the view does not change continuously to reflect such changes. As noted previously, users in an editing group have the option of activating the refresh indicator 154 to permit their personal document view to reflect all current changes.

Electronic content in the form of a presentation comprises collaboration elements at the slide and/or object level. Again, highlighting or some other mechanism, such as shading or dimming, can be used to indicate to other members in the group that a particular member is actively working on the highlighted element. If an element is being changed in such a way that it effects the order of the presentation (e.g., the presentation content is moved, deleted, or added) or the layout of a slide (e.g., an object is moved, resized, deleted, or added), then the changed element may be displayed in a visually distinctive manner (e.g., dimmed or grayed out), indicating that it has moved within the presentation, or the layout has changed, so that immediate reordering of the presentation, or revision of the view does not distract all other members in the group.

For example, if a global action change is pending with respect to an element, such as a presentation template change, then the refresh indicator 154 can be displayed to indicate the change has been made. However, the change does not have to be immediately implemented for viewing by all users/editors in a group.

Electronic content in the form of a workspace comprises a set of documents that are shared with multiple users. Documents with people actively viewing or making changes to them can be highlighted. Each user can have a different view of the workspace, comprising a separate set of filters and sort orders on the list of documents. If documents are changed so as to affect their sort/filter order for members in the editorial group (e.g., content is added, deleted, there is a name or status change, etc.) then the changed element may be displayed in a revised manner (e.g., dimmed or grayed out), indicating that a change has occurred, without reordering the workspace and distracting the other members in the group.

As is now apparent, the changes in a particular view displayed to an editor in a collaborative group, which occur as a result of that editor's activity, are not necessarily shared among others collaborators immediately or automatically. However, some members in the group may choose to name and save a set of their view preferences (e.g., sorting and/or filtering) as a "named view". If they make one of these named views available for sharing with others in the group, and changes are later made to the view properties by its owner, those changes can be immediately communicated to the others in the group that have chosen to adopt the same shared view (or not, as desired by the others in the group).

A "default" view may be used the very first time a member of the group gains access to electronic content that is to be edited, such as a spreadsheet. Thereafter, the user's last view, plus any unshared changes, can be saved for use across future editing sessions. The user can share the changes in the view specification by saving over an existing named view, or by creating a new named view. Others in the group can be notified of such actions, by changing the views of those that have adopted the changed view as a named view for their own use immediately, or via the use of a refresh indicator.

Turning now to FIG. 1, a few examples of these change types can be examined as they might be implemented in some embodiments. As noted previously, the view 170, presenting content in the form of a spreadsheet table 140 is what might be seen by a current user that is a member of an editing group. The view 172, presenting content in the form of a spreadsheet table 142, is simply another way of looking at the same content that is presented in view 170—in this case, the view 172 is one that might be seen by a sharing user (i.e., another user in the same editing group as the current user.

For the purpose of this explanation, it can also be assumed that the current user, associated with view 170, has specified sorting of the entry numbers, so that entries are sorted in order of least to greatest in the Entry Number column. The sharing user, associated with view 172, does not have this sort order in place. Instead, the sharing user has an alphabetic sort on the State column specified, so that states are sorted from A to Z, in ascending order.

If one assumes that content associated with entry numbers 1, 2, and 3 is added in that order by the current (modifying) user, these entries would then be displayed as shown in the content view 170. Thus, as information is appended to the content in the table 142 by the sharing (modifying) user in the view 172, in the form of information line 146, that same line 146 can also be displayed to the current user in view 170. Neither view will be affected, other than to display the appended line 146, since the values of the appended content in line 146 permit the sort orders in both views 170, 172 to be maintained.

If the content 160 is modified by the sharing (modifying) user to change "AK" to "CA", this change in the value of the content 160 can also be displayed in both views 170, 172. And, other than changing the displayed value, the view 170 will not be affected, since sorting only occurs on the Entry Number column. However, since the State column is sorted in view 172, the view 172 may be revised automatically, or upon user request (e.g., by activating the refresh indicator 154, which is displayed after the data "CA" is entered) to reflect the re-ordering of the content lines.

If content line 148 is first entered by the current (modifying) user in view 170, and then later deleted, the view 170 for the modifying user might appear as shown in FIG. 1. Similarly, the view 172 might appear as shown with respect to content line 150 for the sharing user, where the deleted content is shown in a visually distinctive manner, such as with reduced opacity. The refresh indicator 154 will also likely be displayed, to alert the sharing user that activating the indicator 154 will result in implementing whatever changes are pending, including that which affects the dimmed line 150. In this case, when the indicator 154 is activated, the dimmed line 150 will be removed from the view 172.

In another example of editing activity, the content line 156 may be moved to the bottom of the table 142 by the sharing (modifying) user, perhaps because the sharing user would like to see the effect of sorting the Name column. As part of this editing activity, the sharing (modifying) user might also insert content line 162 into table 142. Eventually, the sharing (modifying) may also move content line 146 to the top of the table 142, completing the test of the new sort order. An automatic sort of the Name column might later be implemented if the sharing user determines this type of sort order is more useful.

In response to these changes by the sharing user, the view 170 of the current user might change as follows: (a) no change to the view of content line 158 should occur, since the sort order for the view 170 remains undisturbed; (b) the line 164 may be eventually seen as shown in view 170, after the refresh indicator 152 is activated to permit sorting of the Entry Number column in view 170 to proceed; and (c) no change to the view of content line 146 should occur, since the sort order for the view 170 remains undisturbed.

Figure 2:
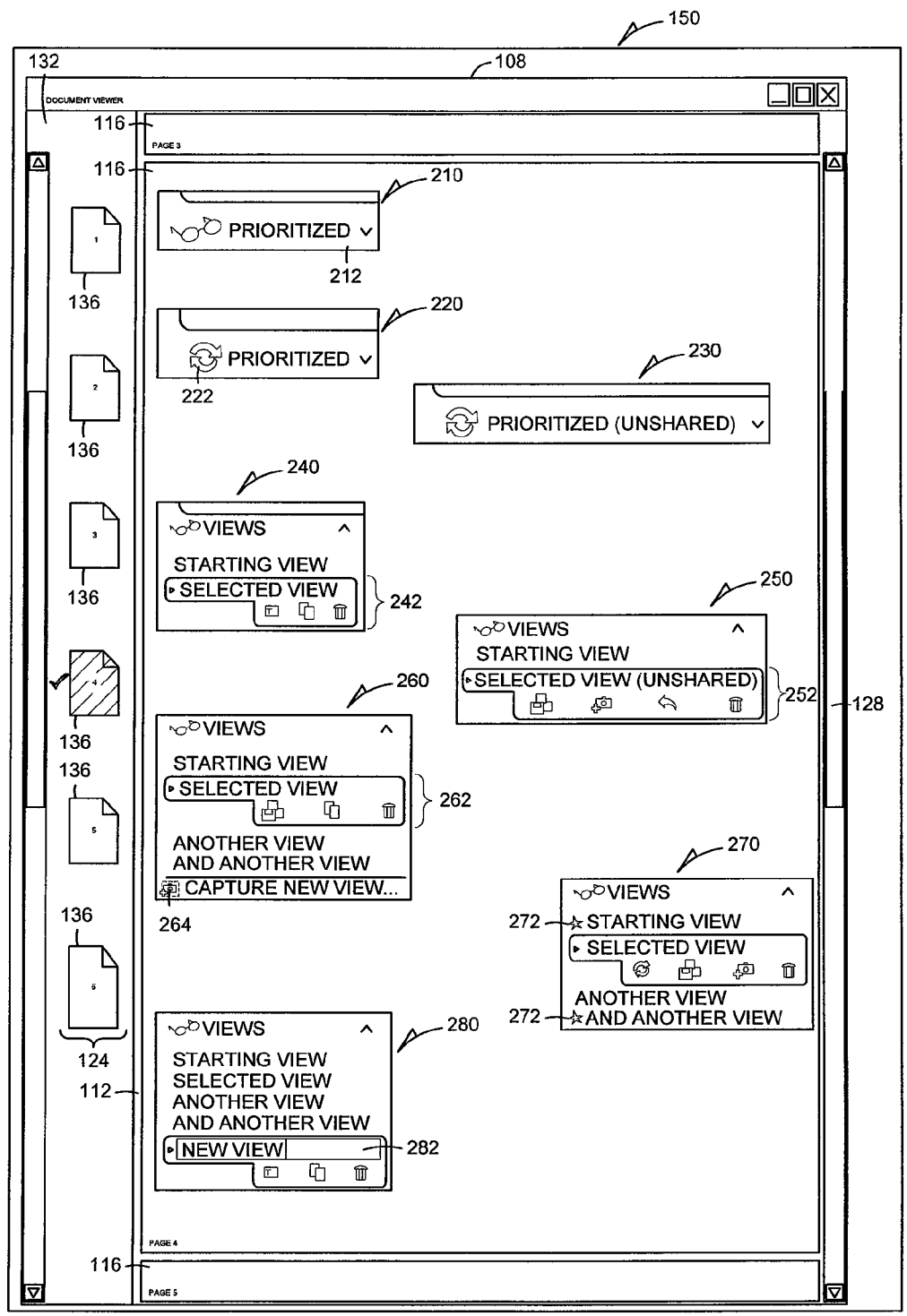
FIG. 2 illustrates view management mechanisms as part of a GUI, according to various embodiments.

FIG. 2 illustrates view management mechanisms as part of a GUI 108, according to various embodiments. In this case, several view management tabs are shown, each indicating a different aspect of how views can be created, named, saved, shared, and deleted.

Tab 210 present a basic illustration of a named view. In this case, the single existing view is named "Prioritized". The upside-down carat 212 indicates that this tab 210 can be activated to display further view management features.

Tab 220 shows the same named view as tab 210, with the addition of an "arrow-chasing-arrow" icon 222 used as a refresh indicator. Here, the user is alerted that at least one change has been made by someone else with respect to the electronic content being edited, and that the icon 222 can be activated to update the user's current "Prioritized" view to reflect incorporation of all such changes.

Tab 230 further indicates that the named view "Prioritized" is unshared. Thus, this named view, although it may be partially saved for future use by the current viewer, may also have changes that have not been made available by the current viewer for use or adoption by others in the collaborative editing group.

Tab 240 has been activated and shows that two named views exist: a "Starting View", and the "Selected View". The view that has been selected by the current viewer, that is the "Selected View", offers the opportunity, via icons 242, to rename the "Selected View", copy the "Selected View", or delete the "Selected View".

Tab 250 is similar to tab 240, except that the current viewer is alerted to the fact that (a) some aspects of the current user's view specification have changed (and they are not yet shared with others, hence the "unshared" indicator 252), and (b) the icons 254 have changed. In this case, the icons 254 offers the opportunity to share the "Selected View" (which also operates to save the changed view specifications) with others in the group, to save the "Selected View" as a new view, to revert to the last saved state of the "Selected View", or to delete the "Selected View".

Tab 260 shows that four named views now exist: a "Starting View", the "Selected View", "Another View", and a view named "And Another View". The view that has been selected by the current viewer, that is the "Selected View", offers the opportunity, via icons 262, to share the "Selected View", copy the "Selected View", or delete the "Selected View". At the bottom of the tab 260, the option 264 of capturing a "New View" is offered.

Tab 270 illustrates the presence of star-shaped refresh indicators 272 that show changes have occurred to the specifications for the "Starting View" and the view titled "And Another View" (presumably both owned by someone other than the current viewer). Refresh indicators 272 may be animated, if desired, to draw attention to their presence, especially if they are shown for a limited time only. For example, when tab 270 is closed, the indicators 272 may not appear the next time it is opened if the changed views have already been saved and shared by the owners.

In tab 280, the option is offered to capture a new view using the current view appearance. In this case, if the current view appearance is captured, it will be named "New View" according to the user entry in the view title box 282. After capture, the view "New View" will be selected, and the prior active view will be saved, as needed.

In some embodiments, when the task of editing a document is not shared, the opportunity to name and save views may be hidden from the user, perhaps by default. In this case, view navigation functions may be invisible.

When users share the task of editing a document for the first time, if they have not created other views, the current view may be captured as a new "Starting View". The user can then use navigation menus, perhaps embodied as a series of tabs, such as tab 280, to work with views if they choose to do so (e.g., to save multiple different named views, or to adopt views saved by others in the group of sharing/collaborating editors).

Thus, the user can usually choose to create a new view at any time. This activity may serve to initiate the appearance of a view management panel (perhaps in the form of the tabs shown in FIG. 2). If the user has created views prior to sharing, and is working in an unsaved view, then such users that choose to share may be asked if they wish to save the current view. If the user has created views prior to sharing, and is working in a view state that has already been saved, then sharing continues as previously described.

In this way, various ways of working together can be adopted by the editors in a group. For example, in a "Let Me Work" mode, view changes may be isolated to the person performing them. Filtering, sorting, etc. may be obvious enough in the visual sense that the user has a clear idea of how they see the data. This set of circumstances, combined with social processes (e.g., email, meeting, phone call), can resolve the infrequent out-of-synchronization situations without constantly interfering with the user's current view.

The user can save their view, and they can also save changes to the view specification as new views.

In a "Common View with Isolation" mode, shared view changes are more easily accommodated. In this case, changes to a view are communicated to all others that have adopted the same view. Manual view changes are permitted as desired. In this way, multiple personal views can be changed and shared. Refresh indicators are displayed when anyone changes the view they are using. Views can be saved, perhaps automatically as each user makes changes to their view specifications.

In a "Public or Private View" mode, aspects of the two prior modes can be combined. Here a view can be designated as public, or private. Public view changes are openly shared, but private view changes may not be (depending on permissions granted by the owner of the view). With a public view, everyone in a group can see changes that are made. With a private view, no one except the owner may make and see changes to the view.

Named views may have a color associated with the user that owns the view. The color used may refer to a color assigned to each user in a document sharing list. If a particular view was saved by a user no longer present on the document sharing list, the view may be designated using a gray color.

It should be noted that the various implementations described in association with FIGS. 1 and 2 can be implemented by receiving information about the changes that have occurred with respect to electronic content, and then displayed. Thus, the changes may be detected at one location (e.g., using a server), and then information regarding the changes, and/or implementing various types of change, may be transmitted to another location (e.g., to a receiving entity, such as one or more clients) to enable display of the changes, and various view effects resulting from the changes. Thus many embodiments may be realized. Some of these include a variety of methods.

Figure 3:
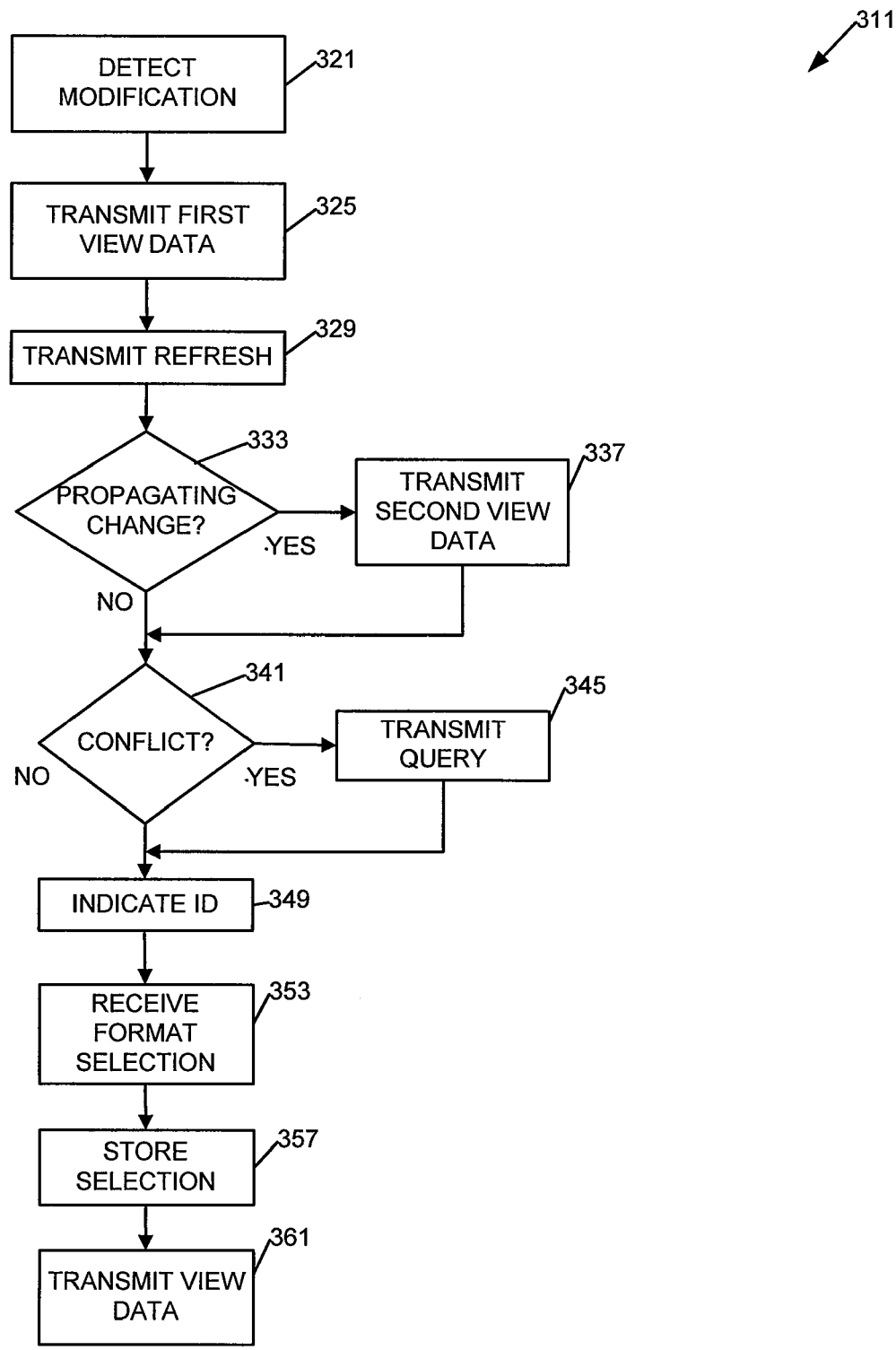
FIG. 3 is a flow diagram illustrating several methods according to various embodiments.

For example, FIG. 3 is a flow diagram illustrating several methods 311 according to various embodiments. Here, the methods 311 might be used to illustrate multi-user editing from the viewpoint of a central server or content repository. For example, in some embodiments, a multi-user collaborative editing process may operate using several clients acting as simple rendering viewports to a central server application that selectively transmits view update information. The content to be edited, as well as the information that is transmitted, can be stored in many formats, including a spreadsheet file format, a presentation file format, a database format, or a word processing format. In addition to these, forms, maps, pivot tables, charts, address cards, and others, can also be used.

For example, in some embodiments, a computer-implemented method 311 that encompasses collaborative editing operations with respect to information, such as electronic content, may begin at block 321 with detecting a modification to the information. The modification may be received from a modifying user included in a group of users sharing the information by separately viewing presentations of the information. The presentations may have a first view (e.g., the view seen by the modifying user), a second view (the view seen by at least some other sharing users in the group), and other views.

The method 311 may continue on to block 325 with transmitting first view data to enable altering the first view for the modifying user based on the modification, whether the modification comprises a propagating change to change the substance of at least one value of data included in the information, or a non-propagating change that does not operate to change the substance.

The method 311 may include, at block 329, transmitting refresh data to enable displaying a refresh indicator that indicates the second view and/or other views are stale. That is, as explained previously, a refresh indicator can be displayed to non-modifying users sharing editing tasks with respect to some designated electronic content, to let them know their view is out of date. They can then activate the refresh indicator to make their view reflect the current state of the data, e.g., a sort or filter in effect as part of their view will be updated to reflect the latest data values, to include re-filtering or re-sorting the current data values.

If the modification comprises a propagating change, as determined at block 333, the method 311 may continue on to block 337 with transmitting second view data to enable altering at least the second view for at least some of the group of users, not including the modifying user, based on the modification.

Transmitting the second view data at block 337 may occur when the modification comprises a propagating change, perhaps including one or more of adding, deleting, changing value, or changing field existence for the at least one value of the data forming part of the second view (and/or other views). In some cases, transmitting the second view data enables displaying the propagating change in a visually distinctive manner, such as with reduced opacity or revised location.

Thus, a propagating change made by the modifying user may result in a command to display the change with reduced visibility to others in the group—so it is apparent that a change has been made by another, without radically disrupting the view of those users that did not make the change. This might occur when the modifying user deletes items in a database, for example. Another way to avoid disruption is to revise the location of an element, such as relocating data that is inserted into the middle of table by a modifying user, to the end of the table viewed by other users, rather than placing the data in the middle of their table views as well.

The activity of transmitting second view data at block 337 may further comprise transmitting the second view data to enable displaying at least some of the information in a visual matrix format (e.g., rows and columns). Other formats, such as lists, paragraphs, pages, etc. can also be used.

The activity of transmitting second view data at block 337 may also comprise transmitting the second view data to enable changing a visible indication of one or more content values, but not the visual arrangement corresponding to the second view. In this way, the second view data is only used to update visible values of data, but not their visual arrangement. In addition, the activity at block 337 may include transmitting the second view data to enable changing the visual arrangement of the second view upon receiving a request from one of the users. This might occur when a refresh indicator is activated by non-modifying users, for example.

If the modification detected at block 321 comprises a non-propagating change, as determined at block 333, the method 311 may continue on to block 341 by refraining from the transmitting the second view data. The activity of refraining from transmitting the second view data might occur when the modification comprises a non-propagating change that includes, for example, changing a specification for sorting, filtering, hiding, un-hiding, or style, as applied to one or more values of data forming part of the first view. Because the substance of the data is not changed by a non-propagating change, there is likely no need to transmit updated second view data.

The method 311 may go on to block 341 with determining whether a conflict has been generated with respect to multiple content changes. For example, the modifying user might act to move some of the shared content to a first location, and within a short time thereafter, a sharing user might act to move the same content, or part of the same content, to a second location that is different than the first location.

Thus, in some embodiments, users can make changes at any time (i.e., there is no such thing as "locking" data to prevent changes by more than one person over some selected time period), which can lead to conflicts. To handle these conflicts, such as when two users change the same element within a short period of time, the following process can be employed. Assume that a second user modifies an element that was changed within the previous five seconds by a first user. The result is that the second user's change modifies the first user's change, perhaps before the second user ever has a chance to view the result of the prior change. In this case, the first user can be sent a query to determine whether the first user would like to override the change made by the second user, to restore the effect of the initial change. Any selected time period for detecting this kind of conflict can be used, such as 2, 5, or 10 seconds.

Therefore, if conflicting attempts to implement changes in the content are detected, as determined at block 341, the method 311 may go on to block 345 to resolve the conflict (generated by receiving a change to the original modification within a selected time period after the original modification is first detected), by transmitting a query, including a resolution choice (e.g., to override the change, or not), to the modifying user.

The method 311 may continue on to include, at block 349, indicating the identity of each one of the group of users by transmitting the first view data, the second view data, or both, perhaps to enable associating a color in the presentations with an information activity location for each one of the group of users. In this way, a color may be associated with each one of the users, perhaps shading or outlining a location in a matrix display of the information where that user is currently active.

As noted previously, other mechanisms may also be used to indicate the activity of specific editors in the group with respect to various portions of the content. Such mechanisms may include images (e.g., photos or icons), text (e.g., contact information, such as email addresses, personal preference information, location, etc.), and other identifying information. This can be used to give a more concrete representation of user identities, and to enhance the ease of collaborative communication. Thus, the activity at block 349 may further comprise indicating the identity of at least some of the group of users by transmitting at least one of the first view data or the second view data to enable inclusion of images or textual information, or both, associated with the users as part of the presentations of views.

The method 311 may go on to include, at block 353, receiving user selection input associated with a format of the second view (and/or other views). The input may be used to revise the second view in its own right, or perhaps to revise the second view to match the first view.

The method 311 may go on to block 357 to include storing the user selection input for later recall to provide the format for the second view. In this way, users can select their preferred display format as a named view for future recall. In some embodiments, the method 311 may go on to block 361 to include transmitting matching view data to enable reversible alteration of the second view (and/or other views) to match the first view. Thus, users in the group can elect to have their view match that of the modifying user at any time. The altered view may be reversible, so that a return to the prior view can be effected when desired. Still further embodiments may be realized.

Figure 4:
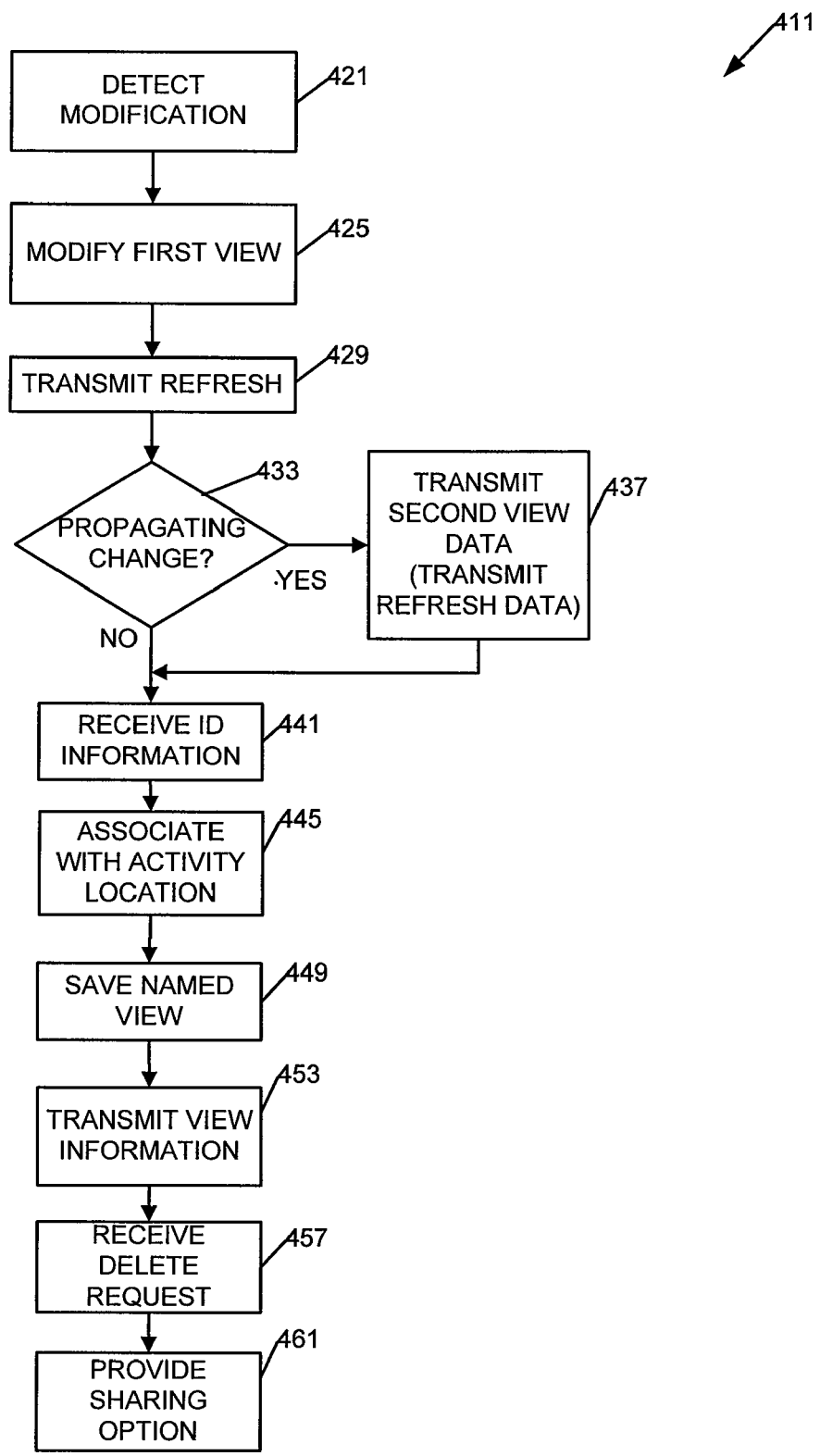
FIG. 4 is a flow diagram illustrating several additional methods according to various embodiments.

For example, FIG. 4 is a flow diagram illustrating several additional methods 411 according to various embodiments. In this case, the methods 411 may serve to illustrate what occurs in some embodiments where several clients each operate to execute a separate editing application, with the edited content stored in a common database housed by a server. Thus, the server relies on the clients to transmit display update information in this case.

In this case as well, the content and/or the information can be stored in many formats, including a spreadsheet file format, a presentation file format, a database format, or a word processing format. In addition to these, forms, maps, pivot tables, charts, address cards, among others, may also be used.

For example, in some embodiments, a computer-implemented method 411 that encompasses collaborative editing operations with respect to information, such as electronic content, may begin at block 421 with detecting a modification to information. The modification may be received from a modifying user included in a group of users sharing the information by separately viewing presentations of the information. The presentations may have a first view, a second view, and other views.

The method 411 may continue on to block 425 with modifying the first view for the modifying user whether the modification comprises a propagating change to change substance of at least one value of data included in the information, or a non-propagating change that does not change the substance. The method 411 may go on to block 429 to include transmitting refresh indicator data to enable indicating that a change to the first view has not been reflected by fully updating the second view (and/or other views). In this way, non-modifying users can be made aware of stale views after changes are made.

If the modification comprises a propagating change, as determined at block 433, the method 411 may include, at block 437, transmitting view data to alter the second view (and/or other views) for at least some of the group of users, not including the modifying user. If the modification comprises a non-propagating change, as determined at block 433, then the method 411 may include refraining from the transmitting the view data.

If the modification comprises a propagating change, in some cases a refresh indicator is displayed, and the other members in the group will not see the full effect of the change by the modifying user until the indicator is activated, e.g., a sort specified as part of the second view will not be revised to reflect new data values entered by the modifying user until the refresh indicator is activated by the sharing users. Thus, the activity at block 437 may include transmitting refresh data to enable displaying a refresh display indicator to be activated before the second view and/or other views are fully updated to reflect the propagating change.

The method 411 may continue on to block 441 to include receiving identity information to enable the modifying user to identify each one of the users in the group. Thus, the modifying user in some embodiments can receive identity information for all other users in the group sharing the information. The method 411 may continue on to block 445 with associating one or more of a color, an image, or textual information in the first view with an information activity location for each identified one of the users in the group.

The method 411 may include, at block 449, saving a visual arrangement of the information associated with the second view (and/or other views) as a named view. The method 411 may continue on to block 453 to include transmitting existence notification data to indicate availability of the named view to the users in the group. In this way, individual views can be named and made available to other users via notification of their existence.

Thus, in some embodiments, the method 411 may comprise receiving existence notification of a named visual arrangement associated with one of the users, not including the modifying user, to be used to alter the first view upon receiving a view revision request from the modifying user. This can occur when, for example, the modifying user requests that their view be revised based on views made available by other members in the group.

In the same vein, the method 411 may also include receiving a request to activate a refresh indicator to fully update the second view (and/or other views) by any one of the users, or just some of the users, so that, for example, a visual arrangement of the second view is refreshed to reflect effects of a propagating change made by the modifying user. Thus, the users in the group can periodically refresh their views to reflect changes in the substance of the data.

The method 411 may go on to include, at block 457, receiving a request to delete a named view comprising one of the first view or the second view. The method 411 may also include, at block 461, providing an option of sharing or not sharing a named view with any or some of the other users in the group, after it is saved by the user offering the option. In this way, named views can be shared, or not.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

As explicitly stated in most cases, and implicitly understood in others, the various implementations described with respect to FIGS. 3 and 4 can be implemented by receiving information about the changes that have occurred with respect to the content being edited, and then displayed. Thus, the changes may be detected at one location (e.g., using a server), and then information regarding the changes, and/or various types of change, may be transmitted to another location (e.g., to a receiving entity, such as a client) to enable display of the changes, as well as various aspects of the changes. Thus, still further embodiments may be realized.

For example, a computer-implemented method may comprise executing instructions on a specific apparatus that result in the detection of a modification to digital electronic signals representing information, the modification received from a modifying user included in a group of users sharing the information by separately viewing presentations of the information, the presentations having a first view and at least a second view. The method may go on to include executing instructions on a specific apparatus that result in modifying the first view for the modifying user whether the modification comprises a propagating change to change substance of digital electronic signals representing at least one value of data included in the information, or a non-propagating change that does not change the substance. The method may also include executing instructions on a specific apparatus that result in: if the modification comprises a propagating change, transmitting digital electronic signals representing view data to alter the at least a second view for at least some of the group of users, not including the modifying user; and otherwise refraining from the transmitting of the digital electronic signals representing view data.

In some embodiments, executing instructions on a specific apparatus that result in the detection of the modification comprise executing the instructions on a first specific apparatus, and executing instructions on a specific apparatus that result in modifying the first view comprise executing the instructions on a second specific apparatus different from the first apparatus. Still further combinations of apparatus executing the various activities may be realized.

Figure 5:
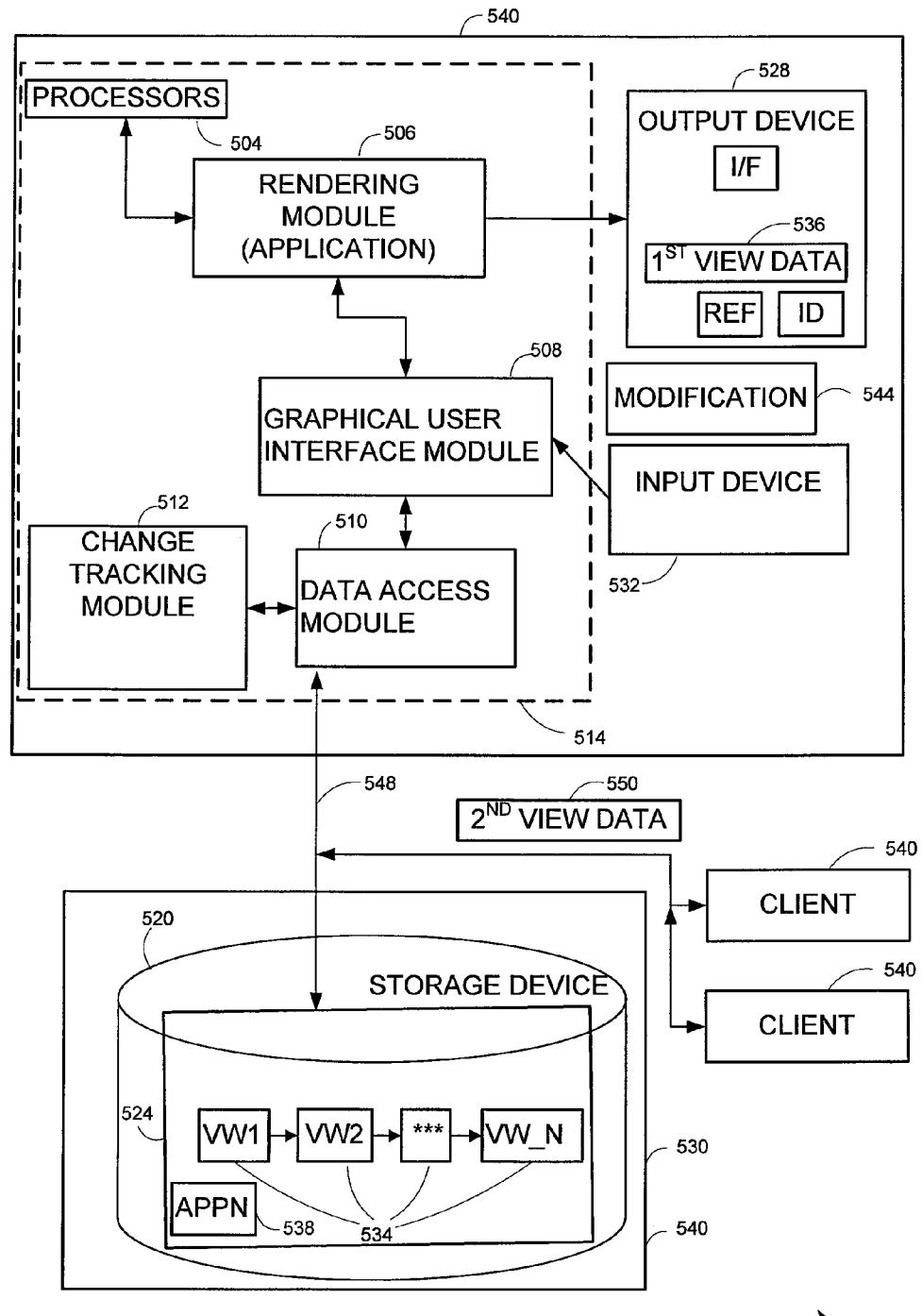
FIG. 5 is a block diagram of a system according to various embodiments.

For example, FIG. 5 is a block diagram of a system 500 according to various embodiments. The system 500 may include a number of modules, such as one or more processors 504, a rendering module 506, a GUI module 508 a data access module 510, and a change tracking module 512. The rendering module 506 and the GUI module 508 may take the form of an integral module, or exist a separate modules, as shown. These modules may be associated within a machine 514, such as a personal digital assistant (PDA), laptop computer, personal computer, workstation, or server, as indicated by their containment within the dashed box.

In order to avoid obscuring the components of FIG. 5, connecting lines between each of the elements within the machine 514 have not been shown. However, those of ordinary skill in the art will understand that any of the individual elements shown to be located within the confines of the machine 514 may be operably coupled to any other element within the machine 514. Similarly, those of ordinary skill in the art will understand that any of the components shown to be located within the confines of the machine 514 may also be located outside the machine 514, and appropriately coupled to the machine 514 via wired or wireless networks or other interface mechanisms.

The data access module 510 may be used by the rendering module 506 and the change tracking module 512 to access a storage device 520, such as a database, a memory, a disk, or other storage device. The storage device 520 may serve to contain one or more items of electronic content 524. The data access module 510 may operate to read from and/or write to the electronic content 524 and may provide reading and writing services for the benefit of other system modules, including the GUI 508, the processor 504, and the rendering module 506. The electronic content 524 may include one or more content elements 534, such as various versions of a document or a database, as well as stored views VW1, VW2, . . . , VW_N, and applications 538, including electronic content editing applications.

The data access module 510 may be present in some embodiments, and absent in others. When present, the data access module 510 may operate as a mediator between the various components of the system 500 and the electronic content 524. For example, the storage device 520 may be included in a remote server 530.

The rendering module 506 may be operably coupled to an output device 528, such as a display screen, printer, or loudspeaker, among others. This output device 528 may be used for presenting renderings of content elements 534. Rendering may take the form of displaying the content elements 534, first view data 536, the identities ID of editing group members, one or more refresh indicators REF, second view data 550, and elements of electronic content 524 that have been selected for display, perhaps as part of a graphical user interface I/F, as is shown in FIGS. 1-2.

A GUI module 508 may be operably connected to the rendering module 506 and the data access module 510. The rendering module 506 may comprise a portable document format processing program, or a database processing program, among others.

The GUI module 508 may receive input from input devices 532 (e.g., a keyboard, a mouse, a trackball, voice recognizer, touch pad, touch screen, etc.), including user input comprising a modification 544 to shared electronic content as part of a collaborative editing operation presented by an electronic content reviewing application. Thus, many embodiments may be realized.

For example, a system 500 to implement collaborative editing operations as described herein may comprise an output device 528 in the form of a display, and a change tracking module 512 to detect changes by a modifying user to information as one of a propagating change, or a non-propagating change. The system 500 may further comprise a rendering module 506 to transmit first view data 536 to enable altering a first view based on the modification as part of a graphical user interface I/F on the display presented to the modifying user. The rendering module 506 may also be used to transmit second view data 550 to enable altering a second view presented to a group of users (e.g., users stationed at client devices 540) based on the modification if the modification comprises a propagating change, and otherwise, refraining from the transmitting of the second view data if the modification comprises a non-propagating change. In some embodiments, the system 500 may comprise a server device 530 including the storage device 520, and one or more client devices 540 to couple to the server device 530 via a network 548.

In some embodiments, the system 500 may include a user input device 532 to select a refresh indicator REF to initiate fully refreshing the second view, including refreshing a visual arrangement of the second view to reflect effects of the propagating change. In some embodiments, the rendering module 506 comprises a spreadsheet application program, and the system 500 further comprises one or more processors 504 to execute the spreadsheet application program to display the information being edited as a spreadsheet, along with identifying information ID associated with individual ones of the group of users. The identifying information ID may comprise images, textual information, etc. as noted previously, and it may be displayed via the graphical user interface GUI.

Figure 6:
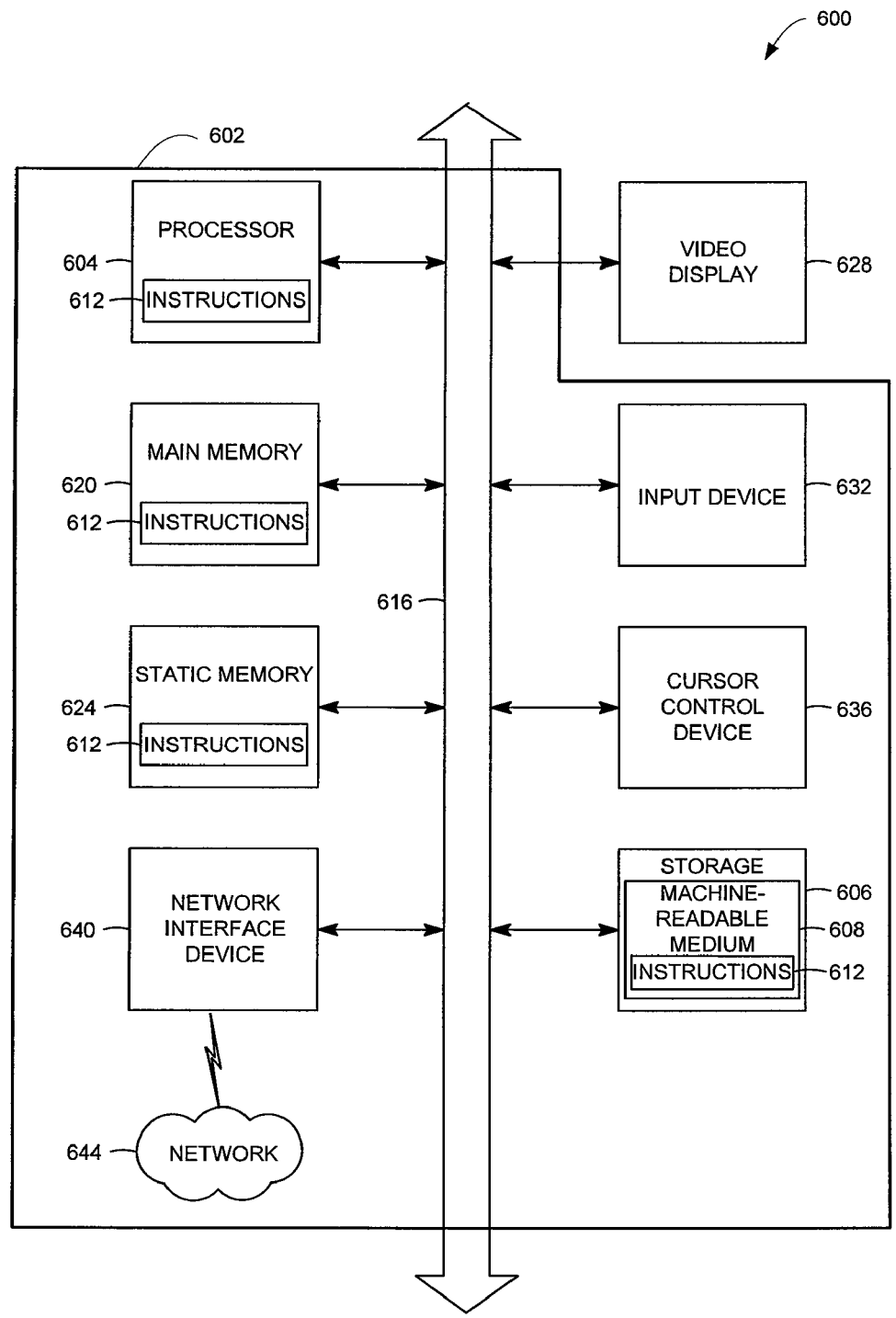
FIG. 6 is a block diagram of an article of manufacture, including a machine, according to various embodiments.

FIG. 6 is a block diagram of an article 600 of manufacture, including a machine 602, according to various embodiments. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment.

Thus, other embodiments may be realized. For example, an article 600 of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor) having instructions 612 stored thereon (e.g., computer program instructions), which when executed by the one or more processors 604 result in the machine 602 performing any of the actions described with respect to the methods above.

The machine 602 may take the form of a computer system having a processor 604 coupled to a number of components directly, and/or using a bus 616. Thus, the machine 602 may be similar to or identical to the system 500 shown in FIG. 5.

Turning now to FIG. 6, it can be seen that the components of the machine 602 may include main memory 620, static or non-volatile memory 624, and mass storage 606. Other components coupled to the processor 604 may include an output device 628, such as a video display, an input device 632, such as a keyboard, and a cursor control device 636, such as a mouse. A network interface device 640 to couple the processor 604 and other components to a network 644 may also be coupled to the bus 616. The instructions 612 may further be transmitted or received over the network 644 via the network interface device 640 utilizing any one of a number of well-known transfer protocols (e.g., the HyperText Transfer Protocol). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. In alternative embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment.

The machine 602 may comprise a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the processor 604 registers, memories 620, 624, and the storage device 606) that store the one or more sets of instructions 612. The term "machine-readable medium" shall also be taken to include any medium that is capable of storing, encoding or carrying a set of instructions for execution by the machine and that cause the machine 602 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Implementing the apparatus, systems, and methods of the various embodiments may provide the ability to more easily and quickly coordinate collaborative editing operations, since potentially disruptive changes to electronic content are communicated to members of a collaborating group in a minimally invasive manner. Thus, as changes occur to the content, changes to views can be controlled according to the tastes of individual collaborators, such that editor comprehension and satisfaction may increase. Errors arising due to conflicting updates between collaborating editors may decrease.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

In this Detailed Description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the Detailed Description are presented in terms of algorithms or symbolic representations of operations on binary digital signals stored within a memory of a specific apparatus or special purpose computing device or platform. In the context of this particular specification, the term "specific apparatus" or the like includes a general purpose computer once it is programmed to perform particular functions pursuant to instructions from program software. Algorithmic descriptions or symbolic representations are examples of techniques used by those of ordinary skill in the signal processing and related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer-implemented method comprising:
   detecting a modification to information, the modification received from a modifying user included in a group of users sharing the information by separately viewing presentations of the information, the presentations having a first view and at least a second view;
   transmitting first view data to enable altering the first view for the modifying user based on the modification whether the modification comprises a propagating change to change substance of at least one value of data included in the information, or a non-propagating change that does not change the substance;
   if the modification comprises a propagating change:
      transmitting second view data to enable altering the at least a second view for at least some of the group of users, not including the modifying user, based on the modification, and
      transmitting refresh data to enable displaying a refresh display indicator to be activated before the at least a second view is fully updated to reflect the propagating change; and
   otherwise refraining from the transmitting of the second view data.

2. The method of claim 1, further comprising:
   transmitting refresh data to enable displaying a refresh indicator indicating the at least a second view is stale.

3. The method of claim 1, wherein the refraining occurs when the modification comprises a non-propagating change that includes changing a specification for sorting, filtering, hiding, un-hiding, or style applied to the at least one value of the data forming part of the first view.

4. The method of claim 1, where the transmitting second view data occurs when the modification comprises a propagating change that includes one of adding, deleting, changing value, or changing field existence for the at least one value of the data forming part of the second view.

5. The method of claim 1, wherein the transmitting second view data further comprises:
   transmitting the second view data to enable displaying the propagating change in a visually distinctive manner.

6. The method of claim 5, wherein the visually distinctive manner comprises reduced opacity.

7. The method of claim 1, further comprising:
   resolving a conflict generated by receiving a change to the modification within a selected time period after the modification is detected, by transmitting a query including a resolution choice to the modifying user.

8. The method of claim 1, wherein the transmitting second view data further comprises:
   transmitting the second view data to enable displaying at least some of the information in a visual matrix format.

9. The method of claim 1, further comprising:
   indicating identity of each one of the group of users by transmitting at least one of the first view data or the second view data to enable associating a color in the presentations with an information activity location for each one of the group of users.

10. The method of claim 1, further comprising:
    indicating identity of at least some of the group of users by transmitting at least one of the first view data or the second view data to enable inclusion of at least one of images or textual information associated with the users as part of the presentations.

11. The method of claim 1, further comprising:
    receiving user selection input associated with a format of the at least a second view; and
    storing the user selection input for later recall to provide the format for the at least a second view.

12. The method of claim 1, further comprising:
    receiving user selection input associated with the at least a second view to revise the at least a second view to match the first view; and
    transmitting matching view data to enable reversible alteration of the at least a second view to match the first view.

13. A computer-implemented method comprising:
    detecting a modification to information, the modification received from a modifying user included in a group of users sharing the information by separately viewing presentations of the information, the presentations having a first view and at least a second view;
    modifying the first view for the modifying user whether the modification comprises a propagating change to change substance of at least one value of data included in the information, or a non-propagating change that does not change the substance;
    if the modification comprises a propagating change:
       transmitting view data to alter the at least a second view for at least some of the group of users, not including the modifying user, and transmitting refresh data to enable displaying a refresh display indicator to be activated before the at least a second view is fully updated to reflect the propagating change; and otherwise refraining from the transmitting of the view data.

14. The method of claim 13, further comprising:

receiving identity information to enable the modifying user to identify each one of the users.

15. The method of claim 14, further comprising:

associating at least one of a color, an image, or textual information in the first view with an information activity location for each identified one of the users.

16. The method of claim 13, further comprising:

if the modification comprises the propagating change, transmitting refresh data to enable displaying a refresh display indicator to be activated before the at least a second view is fully updated to reflect the propagating change.

17. The method of claim 13, further comprising:

saving a visual arrangement of the information associated with the at least a second view as a named view; and transmitting existence notification data to indicate availability of the named view to the users.

18. The method of claim 13, further comprising:

transmitting refresh indicator data to enable indicating that a change to the first view has not been reflected by fully updating the at least a second view.

19. The method of claim 13, further comprising:

receiving a request to delete a named view comprising one of the first view or the second view.

20. The method of claim 13, further comprising:

providing an option of sharing or not sharing a named view with the users, not including the modifying user, wherein the named view has been saved by the modifying user.

21. A machine-readable medium having instructions stored therein, wherein the instructions, when executed, cause the machine to implement a method, the method comprising:

detecting a modification to information, the modification received from a modifying user included in a group of users sharing the information by separately viewing presentations of the information, the presentations having a first view and at least a second view;

transmitting first view data to enable altering the first view for the modifying user based on the modification whether the modification comprises a propagating change to change substance of at least one value of data included in the information, or a non-propagating change that does not change the substance;

if the modification comprises a propagating change, transmitting second view data to enable altering the at least a second view for at least some of the group of users, not including the modifying user, based on the modification; and otherwise refraining from the transmitting of the second view data.

22. The medium of claim 21, wherein the method further comprises:

transmitting the second view data to enable changing a visible indication of the at least one value, but not a visual arrangement corresponding to the at least a second view.

23. The medium of claim 22, wherein the method further comprises:

transmitting the second view data to enable changing the visual arrangement upon receiving a request from one of the users.

24. A computer-implemented method comprising:

executing instructions on a specific apparatus that result in the detection of a modification to digital electronic signals representing information, the modification received from a modifying user included in a group of users sharing the information by separately viewing presentations of the information, the presentations having a first view and at least a second view;

executing instructions on a specific apparatus that result in modifying the first view for the modifying user whether the modification comprises a propagating change to change substance of digital electronic signals representing at least one value of data included in the information, or a non-propagating change that does not change the substance; and executing instructions on a specific apparatus that result in:
if the modification comprises a propagating change:
transmitting digital electronic signals representing view data to alter the at least a second view for at least some of the group of users, not including the modifying user, and
transmitting refresh data to enable displaying a refresh display indicator to be activated before the at least a second view is fully updated to reflect the propagating change; and
otherwise refraining from the transmitting of the digital electronic signals representing view data.

25. The method of claim 24, wherein the executing instructions on a specific apparatus that result in the detection of the modification comprise executing the instructions on a first specific apparatus, and wherein executing instructions on a specific apparatus that result in modifying the first view comprise executing the instructions on a second specific apparatus different from the first apparatus.

* * * * *